Patented Aug. 20, 1940

2,212,150

UNITED STATES PATENT OFFICE 2,212,150

ORGANIC SULPHUR COMPOUNDS

William James Burke, Wilmington, Del., assignor to E. I. du Pont de Nemours & Company, Wilmington, Del., a corporation of Delaware No Drawing. Application December 6, 1938, Serial No. 244,293

15 Claims. (Cl. 260—593)

This invention relates to the preparation of organic compounds and more particularly to the preparation of certain mercaptoalkanones.

This invention has as an object the provision of a new and useful process for the preparation of beta-mercaptoalkanones. A further object is the preparation of new and useful compounds. Other objects will appear hereinafter.

These objects are accomplished by the following invention wherein hydrogen sulphide is reacted with an alpha, beta-unsaturated ketone in a closed system at a temperature above about 20° C., under which conditions pressures substantially above 760 mm. are developed and cause production of the desired products in good yields.

In general the alpha, beta-unsaturated ketone is placed in a pressure vessel, cooled to below −60° C. in an acetone-dry ice bath, the hydrogen sulphide added, and, if desired, piperidine introduced as a catalyst. The vessel is then closed and heated from twelve to twenty-four hours at temperatures ranging from 20–200° C., after which it is cooled and opened. The products are then separated by fractional distillation under reduced pressure. The more detailed practice of the invention is illustrated by the following examples showing the preparation of various beta-mercaptoalkanones. Parts are given by weight.

EXAMPLE I

4-Mercapto-4-Methylpentanone-2

Twenty-seven and eight tenths (27.8) parts of mesityl oxide and ten (10) parts of hydrogen sulphide are placed in a steel bomb tube cooled in an acetone-dry ice bath. The closed vessel is heated for sixteen hours at 155° C., under which conditions pressures of about 1500 lbs./sq. in. are developed after which time it is cooled and opened. Upon fractional distillation nine (9) parts of mesityl oxide is recovered. The second fraction consists of sixteen and five tenths (16.5) parts of 4-mercapto-4-methylpentanone-2, B. P. 60–62° C./13 mm.; yield 65%. Analysis: calculated for CH₃COCH₂C(CH₃)₂SH; S, 24.3%; found: 24.00%.

EXAMPLE II

4-Mercapto-4-Methylpentanone-2

Thirty-four (34) parts of mesityl oxide, twenty-one (21) parts of hydrogen sulphide, and five-tenths (0.5) part of sulphur are placed in a pressure tube cooled in an acetone-dry ice bath. The tube is sealed and heated at 90° C. for forty-eight hours, the pressure being about 1100 lbs./sq. in., after which it is cooled and opened. Upon distillation of the reaction mixture seventeen (17) parts of mesityl oxide is recovered. The second fraction consists of fourteen (14) parts of 4-methyl-4-mercaptopentanone-2. While this quantity represents a relatively low yield as a result of the relatively low temperature (90° C.), this yield is nevertheless considerably higher than that obtained under similar conditions and in the absence of sulphur.

EXAMPLE III

4-Mercapto-4-Methylpentanone-2

To each of three pressure tubes cooled in an acetone-dry ice bath are added thirty-nine and two-tenths (39.2) parts of mesityl oxide, seventeen (17) parts of hydrogen sulfide, and one (1) part of piperidine. The sealed tubes are heated at 90° C. for twelve hours, the pressure developed being about 1100 lbs./sq. in., after which time they are cooled and opened. When the total reaction mixture is fractionally distilled, one hundred and twenty-seven (127) parts of 4-methyl-4-mercaptopentanone-2 was obtained; yield 80%.

EXAMPLE IV

4-Mercapto-5-Ethylheptanone-2

Thirty-seven and eight tenths (37.8) parts of 5-ethylhepten-3-one-2, eighteen and five-tenths (18.5) parts of hydrogen sulphide, and five-tenths (0.5) part of sulphur are added to a pressure tube cooled in an acetone-dry ice bath. After the sealed tube is heated for forty-eight hours at 90° C., the pressure developed being about 1100 lbs./sq. in., it is cooled and opened. Upon distillation thirty-three and five-tenths (33.5) parts of 4-mercapto-5-ethylheptanone-2, B. P. 72–74° C./1 mm. is obtained; yield 71.5%. Analysis: calculated for (C₂H₅)₂CH—CH(SH)—CH₂—CO—CH₃; S, 18.4%; found S, 17.26%.

EXAMPLE V

4-Mercaptobutanone-2 and Bis-(3-Ketobutyl) Sulphide

Forty (40) parts of methyl vinyl ketone and twelve (12) parts of hydrogen sulphide are placed in a pressure tube cooled in an acetone-dry ice bath. The sealed tube is heated for six hours at 70° C., the pressure being initially about 750 lbs./sq. in., after which time it is cooled and opened. The reaction mixture is fractionally distilled under reduced pressure, and twenty-four (24) parts of 4-mercaptobutanone-2, B. P. 60° C./14 mm. is obtained; yield 34.6%. Analysis: calculated for $CH_3COCH_2CH_2SH$: S, 30.75%; found S, 30.46%. The second fraction consists of twenty (20) parts of bis (3-ketobutyl) sulphide; B. P. 123–125° C./2 mm.; yield 39%. Analysis: calculated for $(CH_3COCH_2CH_2—)_2S$: S, 18.38%; found: S, 19.49%.

In this process the temperature may range from that at which the reaction rate becomes detectable, probably about 20° C., to the decomposition temperature of the products which is probably 250° C. or higher. In the case of vinyl ketones, the preferred temperature range is on the order of 20–90° C., with or without a catalyst. In the case of other alpha, beta-unsaturated ketones, the temperature should preferably be about 60–140° C. when a catalyst is present, and about 90–180° C. in the absence of a catalyst.

Although a catalyst is not essential, the use of piperidine, for example, greatly increases the speed of the reaction so that the operation may be carried out at a reasonable rate at temperatures below the critical temperature (100° C.) of hydrogen sulphide. Phosphoric acid and sulphur exert a catalytic effect, but are not nearly so effective as piperidine. Other amines such as diethylamine, propylamine, trimethylamine, ethanolamine, morpholine, pyridine, etc., and basic substances such as sodium hydroxide, potassium hydroxide, calcium oxide, and sodium carbonate may also be used. In general, it is possible to employ any basic material, though amines, which are generally effective, are preferred action. Higher temperatures cause higher pressures to be developed. When the theoretical amount or less hydrogen sulphide is employed, the pressure at the end of the reaction approaches the vapor pressure of the ketones used and produced. However, such proportions still cause sufficient pressures initially and in the early stages of the reaction, as a consequence of the use of closed systems, as to give improved results as compared to open systems, and are accordingly within the scope of the invention.

The invention is generically applicable to alpha,beta-unsaturated ketones and any such may be employed in the process of the present invention. The majority may be formulated as

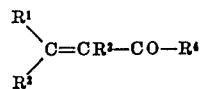

wherein $R^1$, $R^2$ and $R^3$ are hydrocarbon radicals (substituted or unsubstituted), heterocyclic radicals, or hydrogen, and $R^4$ is a substituted or unsubstituted hydrocarbon radical. Thus, the various Rs may be aromatic, heterocyclic, or aliphatic (including cycloaliphatic); saturated or unsaturated; and substituted or not by halogen, ester, ether, hydroxyl and other groups. Additional specific alpha,beta-unsaturated ketones and the products obtained from them by the process of the present invention are listed in the table below:

Table I

| | Name and formula of alpha,beta-unsaturated ketone | Name and formula of product obtained |
|---|---|---|
| 1 | Pentadecen-8-one-7 <br> $C_6H_{13}CH=CHCOC_6H_{13}$ | 9-mercaptopentadecanone-7. <br> $C_6H_{13}CH(SH)CH_2COC_6H_{13}$ |
| 2 | 10-ethyltetradecen-8-one-7 <br> $C_4H_9CH(C_2H_5)CH=CHCOC_6H_{13}$ | 9-mercapto-10-ethyltetradecanone-7. <br> $C_4H_9CH(C_2H_5)CH(SH)CH_2COC_6H_{13}$ |
| 3 | 9-methylpentadecen-8-one-7 <br> $C_6H_{13}C(CH_3)=CHCOC_6H_{13}$ | 9-mercapto-9-methylpentadecanone-7. <br> $C_6H_{13}C(CH_3)CH_2COC_6H_{13}$ <br> \| <br> SH |
| 4 | 2, 7-dimethylocten-5-one-4 <br> $CH_3CH(CH_3)CH=CHCOCH_2CH(CH_3)_2$ | 6-mercapto-2, 7-dimethyloctanone-4. <br> $CH_3CH(CH_3)CH(SH)CH_2COCH_2CH(CH_3)_2$ |
| 5 | Ethylidene acetone <br> $CH_3CH=CHCOCH_3$ | 4-mercaptopentanone-2. <br> $CH_3CH(SH)CH_2COCH_3$ |
| 6 | Ethyl vinyl ketone <br> $CH_2=CHCOC_2H_5$ | 1-mercaptopentanone-3. <br> $HSCH_2CH_2COC_2H_5$ |
| 7 | Benzalacetone <br> $C_6H_5CH=CHCOCH_3$ | 4-phenyl-4-mercaptobutanone-2. <br> $C_6H_5CH(SH)CH_2COCH_3$ |
| 8 | Phorone <br> $(CH_3)_2C=CHCOCH=C(CH_3)_2$ | 2, 6-dimercapto-2, 6-dimethylheptanone-4. <br> $(CH_3)_2C(SH)CH_2COCH_2C(CH_3)_2SH$ |
| 9 | Pseudoionone <br> $(CH_3)_2C=CHCH_2CH_2C(CH_3)=CH—CH=CHCOCH_3$ | 4-mercapto-6, 10-dimethylundecadien-5, 9-one-2. <br> $(CH_3)_2C=CHCH_2CH_2C(CH_3)=CH—CH(SH)CH_2COCH_3$ |
| 10 | Furfuralacetone <br> HC——CH <br> ‖  ‖ <br> HC   C—CH=COCH_3 <br>   \O/ | 4-furyl-4-mercapto-butanone-2. <br> HC——CH <br> ‖  ‖ <br> HC   C—CH—CH_2COCH_3 <br>   \O/   \| <br>         SH |

The process is not limited to the ratio of reactants disclosed in the examples given, but in general an excess of hydrogen sulphide will increase the conversion of the alpha,beta-unsaturated ketone to the corresponding thiol and will ordinarily be used.

The superatmospheric pressures necessary for the operation of the present process and incidental to the use of closed systems are, at the minimum required temperature of about 20° C., substantially and sufficiently above atmospheric. Thus, with the theoretical amount of hydrogen sulphide present, the pressure developed at 20° C. initially will be at least about 250 lbs./sq. in. and will decrease as the hydrogen sulphide is consumed. When an excess of hydrogen sulphide is present, the pressure at 20° C. will remain at about this value throughout the re- A preferred class of alpha,beta-unsaturated ketones is that wherein at least one of the radicals $R^1$ and $R^2$ is a hydrocarbon or substituted hydrocarbon radical, i. e. the class is of alpha, beta-unsaturated ketones wherein the beta carbon has no more than one hydrogen atom linked to it. The products from such ketones are secondary and tertiary beta-mercaptoalkanones, which are new and useful compounds. A further preferred class is that of open chain alpha, beta-unsaturated ketones. These two preferences are united in the subclass of open chain alpha,beta-unsaturated ketones wherein the beta carbon is linked to not more than one hydrogen atom.

The superatmospheric pressure process described herein is a one-step operation which gives superior yields of products which may be readily isolated. The following table shows the results obtained when hydrogen sulphide is bubbled at atmospheric pressure through the alpha,beta-unsaturated ketone under various time, temperature, and catalyst conditions. In this table, "Thiol" refers to 4-mercaptobutanone-2, and "M. V. K." to methyl vinyl ketone.

Table II

| Catalyst | Conditions | Recovered M. V. K. | Thiol | S-compounds of higher B. P. | Residue |
|---|---|---|---|---|---|
|  |  | Percent | Percent | Percent | Percent |
| H₂SO₄ | 2 days at 25° C | 15 | 16 | 25 | 10 |
| None | 1 day at 25° C | 60 | 10 | 20 | 7 |
| Do | 6 hrs. at 45° C. and 18 hrs. at 25° C. | 62½ | 2½ | 20 | 3¾ |
| Do | 6 days at 25° C | 20 | 2 | 42 | 30 |

In contrast to the results shown in Table II, it will be seen from Example V that a 34.6% yield of 3-ketobutanethiol and a 39% yield of bis(3-ketobutyl)sulphide is obtained by heating hydrogen sulphide and methyl vinyl ketone at 70° C. for six hours under superatmospheric pressure. Thus, the process of the present invention, which requires the use of superatmospheric pressure, makes it possible to obtain much better yields of these products in a shorter period of time. The process may be carried out under a wide variety of temperatures and pressures which may be adjusted to obtain the optimum yield of the particular beta-mercaptoalkanone or to comply with available operating facilities. A large number of alpha, beta-unsaturated ketones suitable for use in this invention are potentially available.

The secondary and tertiary beta-mercaptoalkanones prepared as described herein, i. e., the beta-mercaptoalkanones wherein the SH group is attached to a secondary or tertiary carbon atom may be used for many purposes, e. g., as pesticides, as petroleum chemicals, and as intermediates for the preparation of other compounds. These secondary and tertiary beta-mercaptoalkanones are prepared from the preferred ketone reactants, i. e., ketones wherein the beta carbon of the alpha,beta-unsaturated group is attached to not more than one hydrogen atom. Inasmuch as they are compounds not hitherto known they represent a phase of my invention and a particularly preferred one. In being secondary and tertiary thiols, they differ markedly in their reactions and properties as compared to primary thiols such as 4-mercaptobutanone-2.

The above description and examples are intended to be illustrative only. Any modification of or variation therefrom which conforms to the spirit of the invention is intended to be included within the scope of the claims.

I claim:

1. Process of preparing thiols which comprises reacting, at a temperature within the range from 20° C. to the decomposition temperature of the reaction products, in a closed system, an alpha,-beta-unsaturated ketone with hydrogen sulphide.

2. Process which comprises reacting, at a temperature within the range from 20° C. to the decomposition temperature of the reaction products, in a closed sysem at a pressure of at least 250 pounds per square inch, an alpha,beta-unsaturated ketone with hydrogen sulphide.

3. Process of preparing thiols which comprises reacting, at a temperature within the range from 20° C. to the composition temperature of the reaction products, in a closed system at a pressure of at least 250 pounds per square inch, an open chain alpha,beta-unsaturated ketone with hydrogen sulphide.

4. Process of preparing thiols which comprises reacting, at a temperature within the range from 20° C. to the decomposition temperature of the reaction products, in a closed system at a pressure of at least 250 pounds per square inch, an alpha,beta-unsaturated ketone having at most one hydrogen on the beta carbon with hydrogen sulphide.

5. Process of preparing thiols which comprises reacting, at a temperature within the range from 20° C. to the decomposition temperature of the reaction products, in a closed system at a pressure of at least 250 pounds per square inch, an open chain alpha,beta-unsaturated ketone having at most one hydrogen on the beta-carbon with hydrogen sulphide.

6. Process of claim 3 wherein a basic catalyst therefor is employed.

7. Process of claim 3 wherein an amine catalyst is employed.

8. Process of claim 3 wherein a piperidine catalyst is employed.

9. Process of claim 3 wherein a piperidine catalyst and a molecular excess of hydrogen sulphide are employed.

10. Process of preparing thiols which comprises reacting, at a temperature within the range from 20° C. to the decomposition temperature of the reaction products, in a close system at a pressure of at least 250 pounds per square inch, an open chain alpha,beta-unsaturated ketone having at most one hydrogen on the beta carbon with hydrogen sulphide in the presence of an amine catalyst.

11. A beta-mercaptoalkanone of the formula

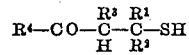

wherein R¹ and R⁴ are monovalent hydrocarbon radicals and R² and R³ are members of the class consisting of hydrogen and monovalent hydrocarbon radicals.

12. An open chain beta-mercaptoalkanone of the formula

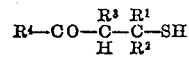

wherein R¹ and R⁴ are monovalent hydrocarbon radicals and R² and R³ are members of the class consisting of hydrogen and monovalent hydrocarbon radicals.

13. An open chain beta-mercaptoalkanone having not more than one hydrogen atom on the carbinthiol carbon.

14. An open chain beta-mercaptoalkanone having only one hydrogen atom on the carbinthiol carbon.

15. An open chain beta-mercaptoalkanone free from hydrogen on the carbinthiol carbon.

WILLIAM JAMES BURKE.

CERTIFICATE OF CORRECTION.

Patent No. 2,212,150. August 20, 1940.

WILLIAM JAMES BURKE.

It is hereby certified that error appears in the printed specification of the above numbered patent requiring correction as follows: Page 1, first column, line 44, for "24.3%" read --24.2%--; page 2, first column, line 54, in the formula, for "COCH$_3$" read --CHCOCH$_3$--; page 3, second column, line 39, for "close" read --closed--; and that the said Letters Patent should be read with this correction therein that the same may conform to the record of the case in the Patent Office.

Signed and sealed this 3rd day of December, A. D. 1940.

(Seal)

Henry Van Arsdale,
Acting Commissioner of Patents.